United States Patent
Moquin

(10) Patent No.: US 7,536,004 B2
(45) Date of Patent: May 19, 2009

(54) SIGNALING SYSTEM

(75) Inventor: Philippe Moquin, Kanata (CA)

(73) Assignee: Mitel Networks Corporation, Ottowa, Ontario (CA)

( * ) Notice: Subject to any disclaimer, the term of this patent is extended or adjusted under 35 U.S.C. 154(b) by 1289 days.

(21) Appl. No.: 10/241,275

(22) Filed: Sep. 10, 2002

(65) Prior Publication Data

US 2003/0053616 A1    Mar. 20, 2003

(30) Foreign Application Priority Data

Sep. 14, 2001   (GB) ............................. 0122288.4

(51) Int. Cl.
*H04M 1/00* (2006.01)
(52) U.S. Cl. .................. 379/387.01; 379/422
(58) Field of Classification Search ......... 379/419–440, 379/387.01
See application file for complete search history.

(56) References Cited

U.S. PATENT DOCUMENTS

| 5,596,638 | A | | 1/1997 | Peters et al. |
| 5,825,837 | A | | 10/1998 | Paterson |
| 5,832,075 | A | | 11/1998 | Gancarcik |
| 5,838,804 | A | * | 11/1998 | Holthaus et al. ............ 381/111 |
| 6,470,197 | B1 | * | 10/2002 | Tuoriniemi et al. ....... 455/575.2 |

FOREIGN PATENT DOCUMENTS

| EP | 0 975 129 A | 1/2000 |
| WO | WO 00 03529 | 1/2000 |

* cited by examiner

*Primary Examiner*—Walter F Briney, III

(57) ABSTRACT

Standard telephone handset ports provide a bias voltage for any attached peripheral devices. The present invention provides bi-directional control signaling where telephone sets vary the bias voltage for detection by peripheral devices and where the peripheral devices provide short, load, and no-load conditions for detection by the telephone sets using the bias voltage.

12 Claims, 4 Drawing Sheets

US 7,536,004 B2

SIGNALING SYSTEM

FIELD OF INVENTION

This invention relates to telephones and in particular to a signaling system between telephones and peripheral devices.

BACKGROUND OF THE INVENTION

Attaching a peripheral device to a telephone via the handset (or headset) port creates a number of difficulties. The most obvious difficulty is that the handset port was only designed with a very limit purposes i.e. receiving and sending voice respectively to a speaker and from a microphone. Thus, there is little or no control signaling through handset ports. This is not a problem if only handset sets were connected to the handset ports. However, this is increasingly not the case.

The most obvious example is that of a headset and a handset connected to a handset port of a telephone set. Thus, the question arises, how is the telephone set to determine which device, the headset or the handset, is active. Typically, the handset must be left off hook either by some mechanical device or by a secondary cradle. Gancarcik in U.S. Pat. No. 5,832,075 disclose a further solution by monitoring the telephone bias voltage of the handset ports. Thus, the telephone set takes action when a switch on the headset interrupts the bias.

The solution disclosed by Gancarcik works well with a passive device such as a headset. However, if one wishes to use more sophisticated peripheral devices such as an add-on speakerphone or a wireless headset, it is desirable for the telephone set to have bi-directional control signaling or communication with the peripheral devices. It is therefore desirable to provide a signaling system, which addresses, in part, some of the shortcomings of handset ports noted above.

SUMMARY OF THE INVENTION

Standard telephone handset ports provide a bias voltage for any attached peripheral devices. The present invention provides bi-directional control signaling where telephone sets vary the bias voltage for detection by peripheral devices and where the peripheral devices provide short, load, and no-load conditions for detection by the telephone sets using the bias voltage.

According to an aspect of the invention, there is provided a signaling system for a telephone set to communicate with a peripheral device connected thereto, the system comprising a circuit for detecting short, load, and no load conditions in the peripheral device; and a power circuit for toggling a bias voltage supplied by the telephone set to the peripheral device, wherein the peripheral device generates said short, load and no-load conditions in accordance with predetermined first patterns to communicate with the telephone set and the telephone set toggles the bias voltage in accordance with predetermined second patterns to communicate with the peripheral device.

According to another aspect of the invention, there is provided a method of communications a telephone set and a peripheral device connected thereto, the method comprising detecting short, load, and no load conditions in the peripheral device; and toggling a bias voltage supplied by the telephone set to the peripheral device, wherein the peripheral device generates said short, load and no-load conditions in accordance with predetermined first patterns to communicate with the telephone set and the telephone set toggles the bias voltage in accordance with predetermined second patterns to communicate with the peripheral device.

BRIEF DESCRIPTION OF THE DRAWINGS

The present invention will be described in detail with reference to the accompanying drawings, in which like numerals denote like parts, and in which.

DETAILED DESCRIPTION OF THE PREFERRED EMBODIMENTS

Figure 1:
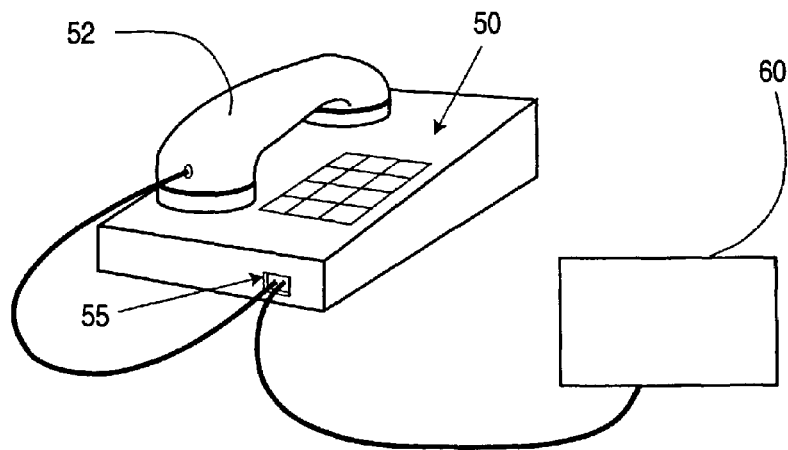
FIG. 1 is a block diagram of a telephone set connected to a peripheral device in accordance with one embodiment of the invention.

Referring to FIG. 1, there is shown a block diagram of a telephone set 50 connected to a peripheral device 60 in accordance with one embodiment of the invention. A handset 52 and the peripheral device 60, a conference unit, is connected to the telephone set 50 via a handset port 55.

Figure 2:
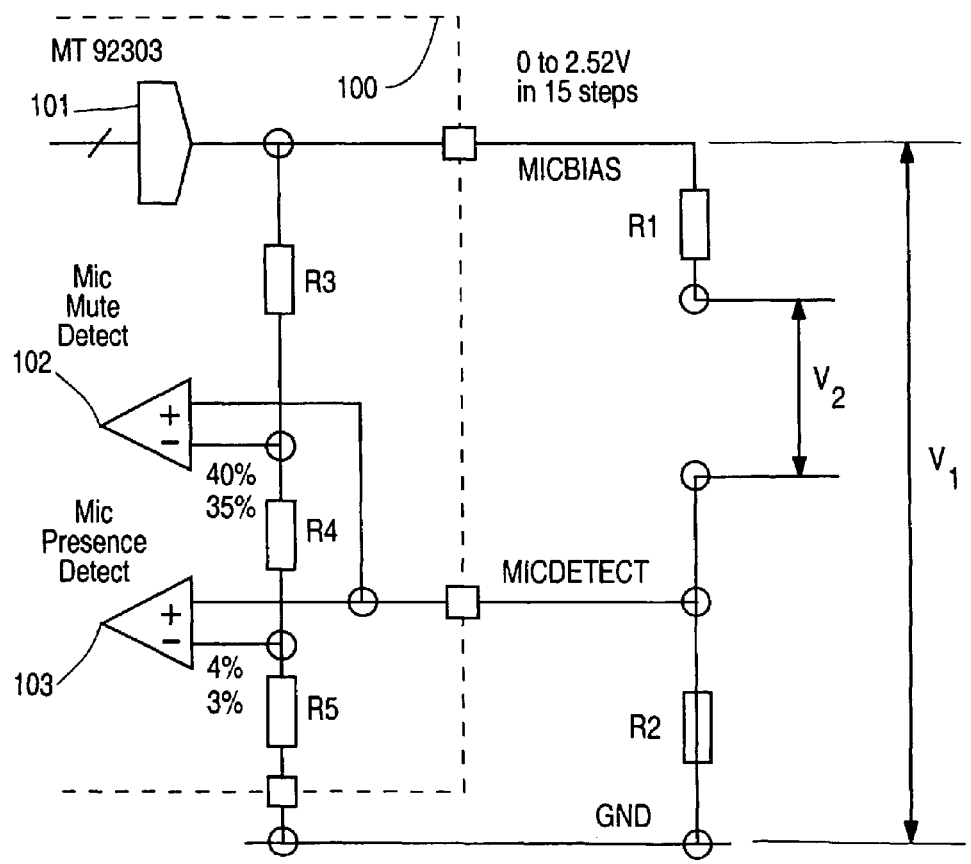
FIG. 2 is a block diagram of a circuit for the telephone set 50 to vary bias voltage and to monitor conditions in the peripheral device.

Referring to FIG. 2, there is illustrated a block diagram of a circuit 100 for the telephone set 50 to vary bias voltage and to monitor conditions in the peripheral device 60. The circuit 100 comprises a power circuit 101 to vary a bias voltage V1 between zero and 2.52 volts (D.C.) under control of a microprocessor (not shown), a first comparator circuit 102 for detecting a short circuit condition in the peripheral device from an input bias voltage V2, and a second comparator circuit 103 for detecting a load condition in the peripheral device from the input bias voltage V2. The combination of the first comparator circuit 102 and the second comparator circuit 103 further detects a no-load condition in the peripheral device from the input bias voltage V2. The input bias voltage V2 is supplied to the peripheral device 60, for example, an add-on speakerphone: the conference unit. A resistor R2 is thus used to so that a voltage drop appears for the input bias voltage V2 when a load is placed across the input bias voltage V2 for the load condition.

The first comparator circuit 102 is configured by a resistance network R3, R4 and R5 to detect changes in the input bias voltage V2 of 35 to 40% to indicate the short condition.

The second comparator circuit 103 is also configured by the resistance network R3, R4 and R5 to detect changes in the input bias voltage V2 of 3 to 4% to indicate the load condition. The configuration of the resistance network R3, R4 and R5 is well known in the art and is also disclosed in U.S. Pat. No. 5,830,075 by Gancarik. A resistor R1 is provided to further differentiate the input bias voltage V2 from the bias voltage V1, but is not necessarily required. Preferably, the circuit 100 is contained within a single integrated chip such as a Mitel (trade mark) MT 92303 dual CODEC.

Under the control of the microprocessor, the bias voltage V1, the output of the power circuit 100, is switch ON and OFF for the telephone set 50 to signal the peripheral device 60. The outputs of the first and the second comparator circuits 102, 103 is received by the microprocessor for the telephone set 50 to receive the signals of the peripheral device 60. Thus, bi-directional control signaling between the telephone set 50 and the peripheral device 60 is provided.

Figure 3:
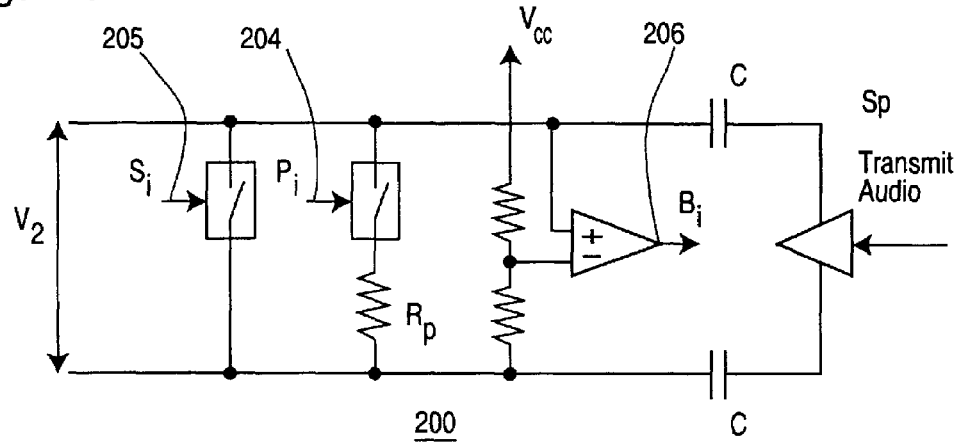
FIG. 3 is a block diagram of a circuit for the peripheral device of FIG. 1 to generate conditions and monitor bias voltage.

Referring to FIG. 3, there is illustrated a block diagram of a circuit 200 for the peripheral device 60 of FIG. 1 to generate the conditions and monitor bias voltage. The circuit 200 receives the input bias voltage V2 and comprises a switch Pi 204 and a resistor Rp for providing the load condition, a switch Si 205 for providing the short condition, and a third comparator circuit 206 for monitoring changes in the input bias voltage V2. The peripheral device 60, in the case of the conference unit, further comprises two blocking capacitors C and a microphone/speaker Sp. The switches Si and Pi are under the control of a peripheral microprocessor (not shown), a controller, for signaling the telephone set 50. The output Bi of the third comparator circuit 206 is received by the controller to indicate signals from the telephone set 50.

The controller closes switch Pi 204 to provide a load, the resistor Rp, across the input bias voltage V2 to generate the load condition. The controller closes switch Si 205 to short the input bias voltage V2 to thus generate the short condition. The third comparator circuit 206 monitors ON and OFF status of the input bias voltage V2 for control signals from the telephone set 50.

Figure 4:
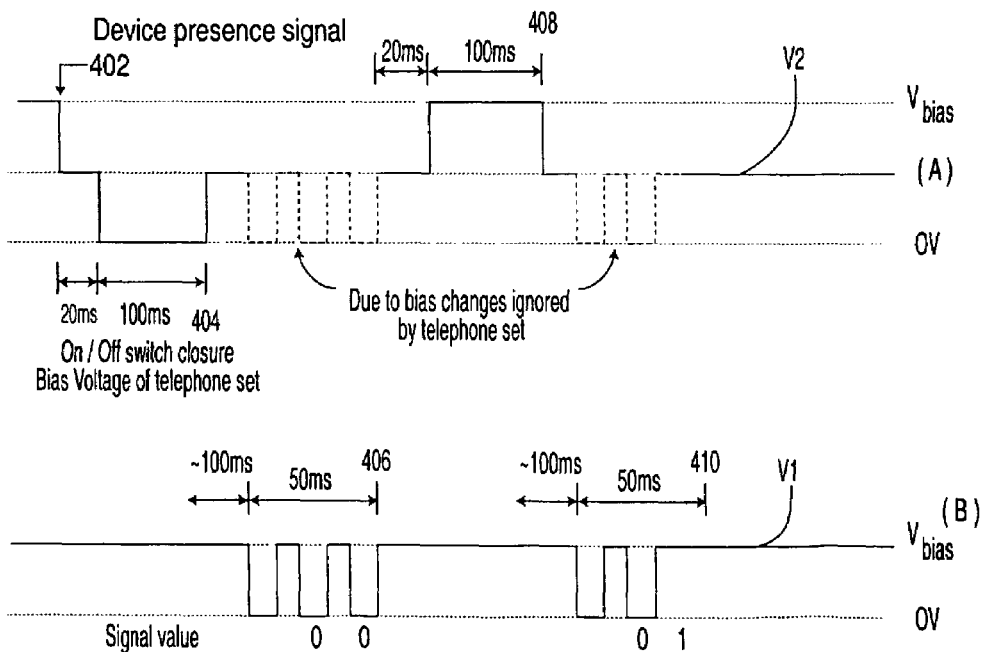
FIG. 4 are voltage diagrams (A) and (B) of input bias voltage V2 and corresponding bias voltage V1 respectively of FIG. 1 showing signaling for initializing the peripheral device.

Referring to FIG. 4, there are voltage diagrams (A) and (B) of the input bias voltage V2 and the corresponding bias voltage V1 respectively of FIG. 1 showing signaling for initializing the peripheral device 60, the conference device. When the conference unit adjunct wishes to inform the telephone set 50 that it is ready for use (for example, on power up or on a user pressing an on/off switch on the conference unit), the controller of the conference unit closes switch Pi 204, which generates the load condition or device presence signal 402 for the telephone set 50 to detect. The controller then closes switch Si 205 for 100 ms, which generates the short condition or a hook switch signal for the telephone set 50 to detect. At this point, the telephone set 50 is able to detect a headset as disclosed in U.S. Pat. No. 5,832,075 by Gancarcik. It is, however, not able to reliably detect between one headset and another peripheral device 60.

The telephone set 50 then toggles the bias voltage V1 in a first predetermined pattern (OFF/ON/OFF/ON/OFF/ON) 406. The controller, by the third comparator circuit 206, detects these changes and, in response, opens the switch Pi 204 for a 100 ms interval 408, which generates a no-load condition in the peripheral device 60, and then re-closes the switch Pi 204. The telephone set 50 then knows that the peripheral device 60 is a conference unit connected to the handset port and signals the conference unit for operation by toggling the bias voltage V1 in a second predetermined pattern (OFF/ON/OFF/ON) 410. The conference unit upon detecting the signal of the second predetermined pattern 410 in the input bias voltage V2 thus starts operating.

Figure 5:
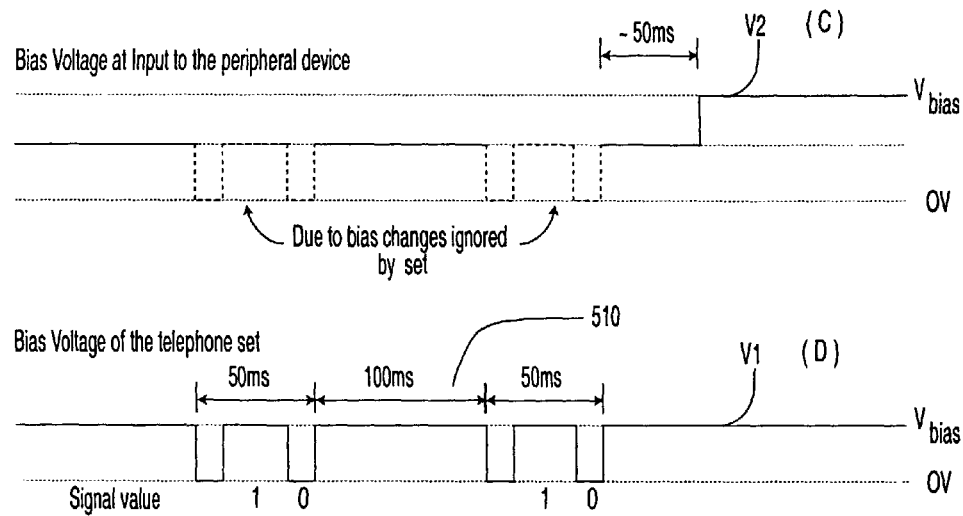
FIG. 5 are voltage diagrams (C) and (D) of the input bias voltage V2 and the corresponding bias voltage V1 respectively of FIG. 1 showing signaling for terminating a call by the telephone set.

Referring to FIG. 5, there are voltage diagrams (C) and (D) of the input bias voltage V2 and the corresponding bias voltage V1 respectively of FIG. 1 showing signaling for terminating a call by the telephone set 50. The telephone set 50 thus toggles the bias voltage V1 in a third predetermined pattern 510. The peripheral device 60 upon detecting the changes in the input bias voltage V2 accordingly to the third predetermined pattern thus terminates operation accordingly.

Figure 6:
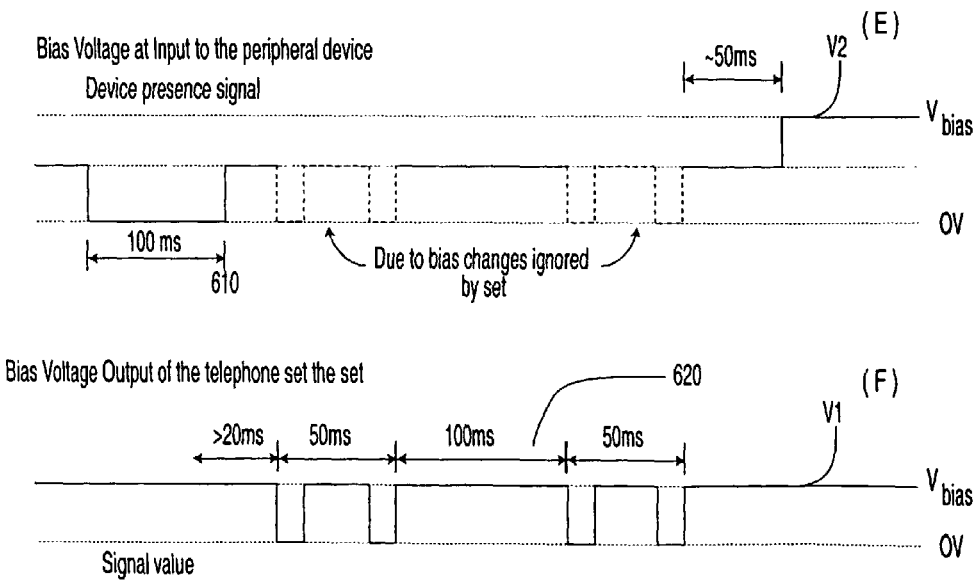
FIG. 6 are voltage diagrams (E) and (F) of the input bias voltage V2 and the corresponding bias voltage V1 respectively of FIG. 1 showing signaling for terminating a call by the peripheral device.

Referring to FIG. 6, there are voltage diagrams (E) and (F) of the input bias voltage V2 and the corresponding bias voltage V1 respectively of FIG. 1 showing signaling for terminating a call by the peripheral device 60. The peripheral device 60 closes the switch Si 205 for 100 ms 610 to request termination of the call and, in response, the telephone set 50 thus toggles the bias voltage V1 in a third predetermined pattern 620 and terminates the call. The peripheral device 60 upon detecting the changes in the input bias voltage V2 in the third predetermined pattern thus terminates operation accordingly.

Figure 7:
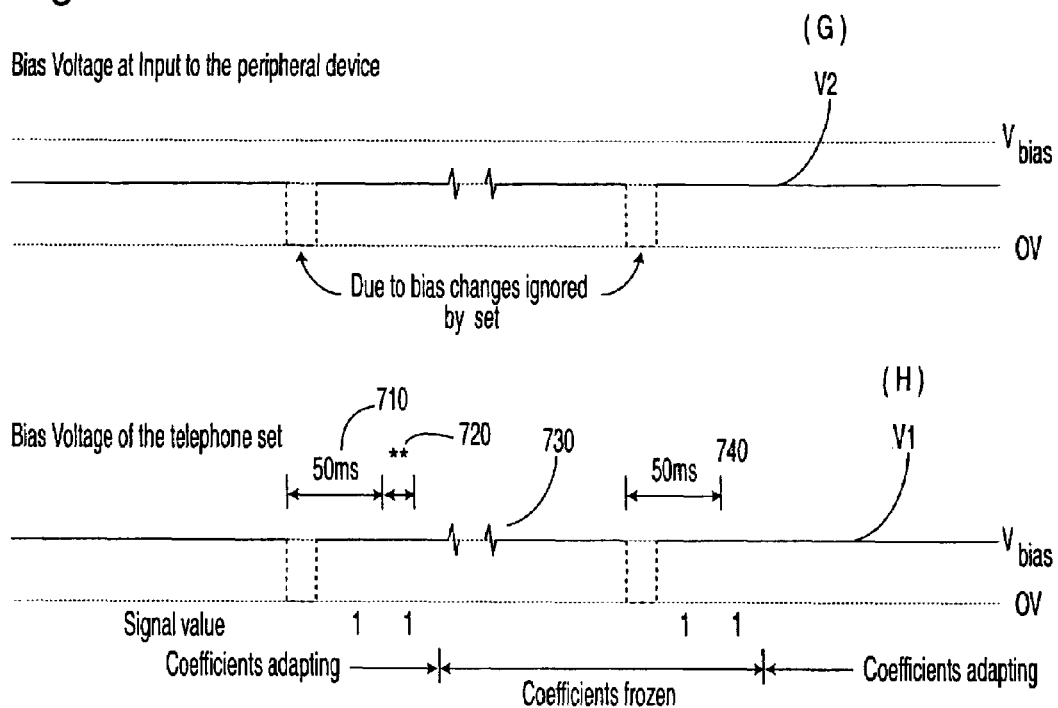
FIG. 7 are voltage diagrams (G) and (H) of the input bias voltage V2 and the corresponding bias voltage V1 respectively of FIG. 1 showing an example of signaling for the telephone set to communicate an event to the peripheral device.

Referring to FIG. 7, there are voltage diagrams (G) and (H) of the input bias voltage V2 and the corresponding bias voltage V1 respectively of FIG. 1 showing an example of signaling for the telephone set 50 to communicate an event to the peripheral device 60. In the peripheral device 60, there is implemented an adaptive filter (not shown). Under certain conditions (such as, for example, generating local comfort DTMF tones), the telephone set 50 generates signals that could significantly disrupt the adaptive filter. Thus, when the telephone set 50 is instructed to generate a local comfort tone (for example, a DTMF key is pressed), the telephone set 50 signals to the peripheral device 60 to halt adaptation of coefficients by a toggle of the bias voltage V1 710. The telephone set 50 then waits an appropriate time interval 720 to ensure the adaptation in the peripheral device 60 is halted. The telephone set 50 then proceeds to generate the comfort tone 730. Once the generation is complete it signals (with the same signal 710), the peripheral device 60 to resume adaptation.

Figure 8:
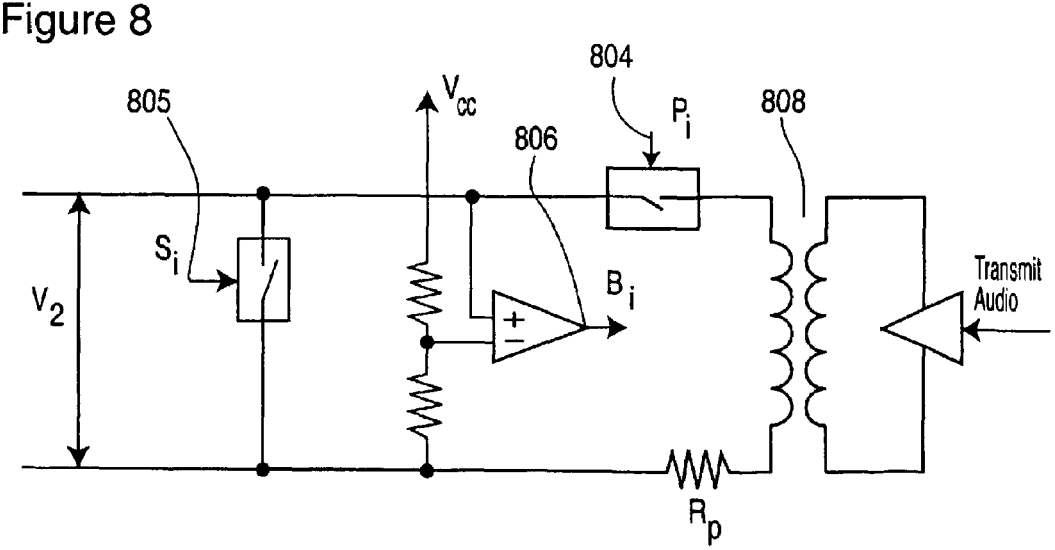
FIG. 8 is a block diagram of an alternate circuit for a peripheral device to generate conditions and monitor bias voltage.

Referring to FIG. 8, there is a block diagram of an alternate circuit for a peripheral device to generate conditions and monitor bias voltage. The alternate circuit 800 comprises a switch Pi 804 in series with a resistor Rp and a coupling transformer 808, a switch 805, and a fourth comparator circuit 806. The switches and the comparator circuit of the alternate circuit 800 are operated in the same pattern as those in FIG. 3. The resistor Rp of FIG. 8, as a load, however can be of lower resistance than the corresponding part of FIG. 3.

It will be understood by those skilled in the art that many other commands can be exchanged between the telephone set and the peripheral device. The choice of using a start and only two signals from the peripheral device to the telephone set 50 was dictated by the desire to simplify the signaling as much as possible but more complex symbols are certainly possible.

It will be understood by those skilled in the art that the present invention can also be implemented in headset ports, or other ports, of telephone sets.

Although preferred embodiments of the invention have been described herein, it will be understood by those skilled in the art that variations may be made thereto without departing from the scope of the invention or the appended claims.

What is claimed is:

1. A signaling system for a telephone set to communicate with a peripheral device connected thereto, the system comprising:

a detecting circuit for detecting short, load, and no load conditions of the peripheral device; and a power circuit for toggling a bias voltage supplied by the telephone set to the peripheral device, the peripheral device having a generating circuit for automatically generating said short, load and no-load conditions in accordance with predetermined first patterns to communicate with the telephone set, the telephone set toggling the bias voltage in accordance with predetermined second patterns to communicate with the peripheral device.

2. The signaling system of claim 1, wherein the detecting circuit detects short, load, and no load conditions in the peripheral device using the bias voltage.

3. The signaling system of claims 1 or 2, wherein the peripheral device communicates its presence to the telephone set by generating a load condition followed by a short condition for a predetermined duration.

4. The signaling system of claims 1 or 2, wherein said predetermined first patterns identify said peripheral device.

5. The signaling system of claims 1 or 2, wherein said predetermined second patterns represent instructions to said peripheral devices.

6. The signaling system of claims 1 or 2, wherein said predetermined first patterns represent instructions to said telephone set.

7. A method of communication between a telephone set and a peripheral device connected thereto, the method comprising:

detecting short, load, and no load conditions of the peripheral device;

toggling a bias voltage supplied by the telephone set to the peripheral device, the peripheral device automatically generating said short, load and no-load conditions in accordance with predetermined first patterns to communicate with the telephone set, the telephone set toggling the bias voltage in accordance with predetermined second patterns to communicate with the peripheral device.

8. The method of claim 7, wherein the short, load, and no load conditions in the peripheral device are detected using the bias voltage.

9. The method of claims 7 or 8, wherein the peripheral device communicates its presence to the telephone set by generating a load condition followed by a short condition for a predetermined duration.

10. The method of claims 7 or 8, wherein said predetermined first patterns identify said peripheral device.

11. The method of claims 7 or 8, wherein said predetermined second patterns represent instructions to said peripheral device.

12. The method of claims 7 or 8, wherein said predetermined first patterns represent instructions to said telephone set.

* * * * *